United States Patent [19]
Uchida

[11] 3,847,490
[45] Nov. 12, 1974

[54] BALL JOINT
[75] Inventor: Yasuo Uchida, Hamamatsu, Japan
[73] Assignee: Ishikawa Tekko Kabushiki Kaisha, Tokyo, Japan
[22] Filed: Mar. 8, 1973
[21] Appl. No.: 339,373

[30] Foreign Application Priority Data
Apr. 28, 1972 Japan............... 47-43100

[52] U.S. Cl. .................. 403/140, 184/1 E
[51] Int. Cl. ............................. F16c 11/06
[58] Field of Search................... 252/12.2; 403/122–141; 184/1 E; 308/DIG. 8

[56] References Cited
UNITED STATES PATENTS

| 3,004,786 | 10/1961 | Herbenar | 403/140 |
| 3,224,967 | 12/1965 | Battista | 252/12.2 |
| 3,695,651 | 10/1972 | Stuck | 403/140 |

Primary Examiner—Geo. V. Larkin
Attorney, Agent, or Firm—Stevens, Davis, Miller & Mosher

[57] ABSTRACT

This invention relates to a ball joint, which comprises a housing, a stud shaft formed at one end thereof with a ball disposed in the interior of said housing, bearing means in said housing for rotatably supporting said ball formed at one end of said stud shaft, and silicone oil sealed in said housing added to a chemically inert material for increasing the consistency thereof to serve as a lubricant.

5 Claims, 1 Drawing Figure

PATENTED NOV 12 1974
3,847,490
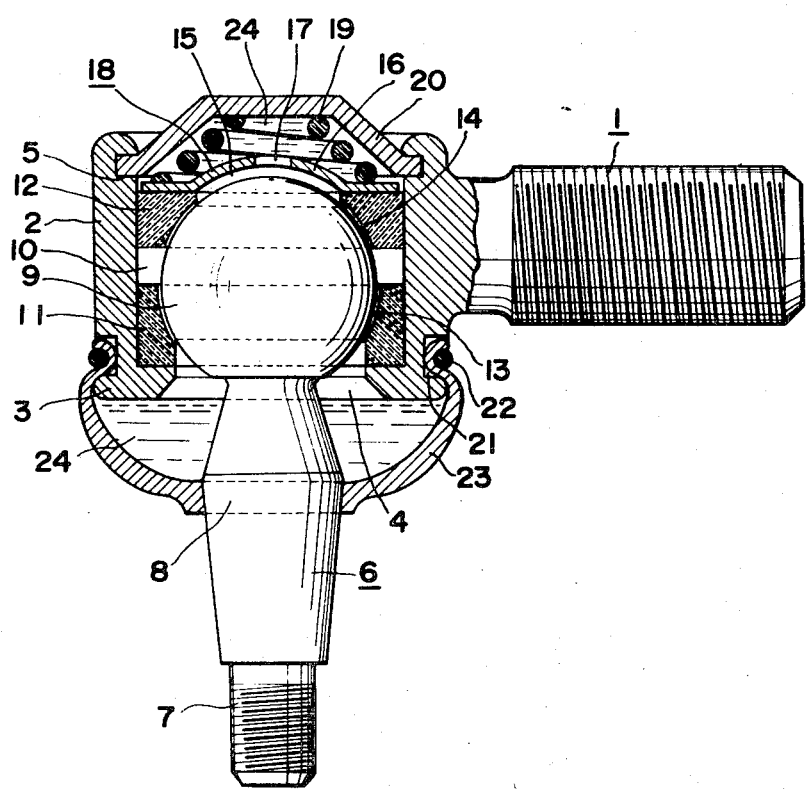

BALL JOINT

This invention relates to ball joints used in the articulated connections for the suspension device or steering system for motor vehicles, and more particularly it is concerned with a ball joint having an improved resistance to elevated temperatures.

Bearings for the ball joints of the type described have hitherto been made of an elastomer, such for example as polyurethane or the like. The ball bearings of the character described offer advantages in that they are oilless which means that they do not require an additional supply of oil and yet have a prolonged service life, and that they are highly capable of absorbing vibrations and shocks.

However, some disadvantages are associated with polyurethane elastomers or the like. They possess no problems when used in a normal temperature range, but they show a great reduction in strength and durability when used at elevated temperatures, particularly in the presence of grease of the conventional type. This is due to the fact that the physical properties of a polyurethane elastomer or the like show marked deterioration when it is subjected to the chemical action of a certain component of grease at elevated temperatures.

The supply of grease to the bearings is intended to lubricate the bearing surfaces so as to obtain smooth rotations or angular movements of the balls of the ball joints. Essentially, grease is not a simple material but a mixture of mineral oil, metallic soap, a constitution stabilizer, an anticorrosive, an antioxidant and other additives. Grease is thus homogenized by keading when prepared but its components tend to be separated from one another at elevated temperatures, resulting in deterioration in quality. This makes it impossible for grease to perform lubrication satisfactorily at elevated temperatures, so that ball joints of the prior art are unable to be placed in service over a prolonged time interval without delivering an additional supply of oil.

An object of this invention is to provide an improved ball joint which obviates the aforementioned disadvantages of the prior art.

Another object of the invention is to provide a ball joint which is capable of functioning satisfactorily as a joint irrespective of changes in temperature and which has increased durability when used at elevated temperatures by using a silicone oil as a lubricant for the ball joint, such silicone oil being added with silica gel or other chemically inert material so that deterioration in quality of polyurethane elastomer or the like making up the bearing for the ball joint can be precluded.

Additional and other objects as well as features and advantages of the invention will become evident from the description set forth hereinafter when considered in conjunction with the accompanying drawing.

The drawing iis a vertical sectional view of the ball joint comprising one embodiment of the invention.

In the drawing, 1 is a socket which is formed integrally with a cylindrical housing 2 at one end thereof. The housing 2 is formed at its lower end with a flange 3 extending radially inwardly of the housing 2 to define an opening 4 centering at the vertical axis of the cylindrical housing 2. The upper end of the housing 2 is formed on its inner periphery with a recess extending radially outwardly of the housing 2 to provide a cover locking offset portion 5 therein.

6 is a stud shaft which is formed with an externally threaded portion 7 at one end portion thereof, a portion contiguous with the externally threaded portion 7 and having an increasingly greater diameter in going toward the middle of the stud shaft 6, and a maximum diameter portion 8 contiguous at one end thereof with the increasingly greater diameter portion and at the other end thereof with a decreasing diameter portion which is formed at its minimum diameter end with a ball 9.

The ball 9 has its lower portion and its upper portion being held by bearings 11 and 12 respectively which are disposed in the interior of the housing 2 which has a gap 10 between its side wall and the middle portion of the ball 9. The bearings 11 and 12 are made of polyurethane elastomer having a crosslinking constitution, or a material containing polyurethane elastomer. The lower bearing 11 has an outer peripheral surface maintained in intimate contact with the inner wall surface of the housing 2 and the inner wall surface of the flange 3 and an inner peripheral surface which is curved such that it forms an arcuate surface maintained in intimate contact with the ball 9. The upper bearing 12 has an outer peripheral surface maintained in intimate contact with the inner wall surface of the housing 2 and an inner peripheral surface which is curved such that it forms an arcuate surface maintained in intimate contact with the ball 9. The bearings 11 and 12 are formed on their inner peripheral surfaces with oil grooves 13 and 14 extending vertically of the bearings and opening at their upper and lower ends.

Mounted on top of the upper bearing 12 is a spring washer 18 formed in its central portion with an arcuate portion 16 parallel to the upper portion of the ball 9 and formed with an opening 17 in its middle, the arcuate portion 16 of the washer 18 and the upper portion of the ball 9 defining therebetween a gap 15. A cover 20 is secured to the upper portion of the housing 2 by having its marginal portion received in locked engagement in the offset portion 5 of the housing 2. A coil spring 19 is mounted between the lower surface of the cover 20 and the upper surface of the washer 18.

The opening 4 in the lower end of the housing 2 through which the stud shaft 6 extends is covered with a cylindrical dust cover 23 made of rubber or other flexible material having one end received in a groove 21 formed on the outer peripheral surface of the housing 2 and clamped in position by a ring 22 and the other end maintained in intimate contact with the maximum diameter portion 8 of the stud shaft 6.

The gaps 10 and 15 in the housing 2, the interior of the cover 20 and the interior of the lower cover 23 are filled, at the time the parts are assembled to produce a ball joint, with silicone oil 24 added with silica gel or other chemically inert material for increasing the consistency thereof.

The silicone oil added with silica gel or other inorganic filler is as consistent and viscous as grease and marketed in Japan by Toray Silicone Co., Ltd. under the trade names of $SH_4$ Silicone Compound. $DC_5$ Silicone Compound and $SH_{103}$ Silicone Compound. These compounds exhibit excellent properties as lubricants of showing no changes in viscosity when subjected to temperature variations and function satisfactorily in a wide range of temperatures or from −40° to 200°C. They cause almost no deterioration at elevated temperatures, particularly in the presence of grease, in the physical properties of high molecular compound having ester-bonding, such for example as polyurethane, polyester or the like.

As aforementioned, grease-like silicone oil added with silica gel or other inorganic filler is used as a lubricant for the bearings of the ball joint. This feature offers the advantages of grease being retained on the bearing surfaces without leaking, being serviceable over a prolonged period of time and preventing the ball joint from being soiled with oil. The ball of the ball joint according to the invention rotates smoothly irrespective of temperature variations, so that the ball joint functions satisfactorily at all times.

The use of the silicone oil added with silica gel or other inorganic filler minimizes deterioration in the physical properties of the bearings and dust cover made of an elastomer, such for example as polyurethane or the like, or a material containing polyurethane elastomer or the like when the ball joint is employed at elevated temperature. A reduction in the strength of the bearings and dust cover can thus be precluded and their durability at elevated temperatures is increased.

What we claim is:

1. A ball joint including synthetic bearings means and including lubricant for prolonging the high temperature operating life of said bearing means, said joint comprising:
   a housing;
   a stud shaft having a ball formed at one end thereof, said ball being disposed within said housing;
   bearing means for rotatably supporting said ball in said housing, said bearing means consisting of a high molecular weight plastic material having ester-type bonds therein; and
   a lubricant sealed within said housing, said lubricant consisting of silicone oil and a chemically inert material, said lubricant for minimizing deterioration and prolonging the high temperature operating life, of said bearing means.

2. A ball joint as set forth in claim 1 wherein said bearing means is made of polyester elastomer.

3. A ball joint as set forth in claim 1 wherein said bearing means is made of a material containing polyester elastomer therein.

4. A ball joint as set forth in claim 1 wherein said bearing means is made of polyurethane elastomer.

5. A ball joint as set forth in claim 1 wherein said bearing means is made of a material containing polyurethane elastomer therein.

* * * * *